(12) United States Patent
Cigarini (10) Patent No.: US 9,750,181 B2
(45) Date of Patent: Sep. 5, 2017

(54) HEAD FOR A LINE HEDGE TRIMMER

(75) Inventor: Enrico Cigarini, Reggio Emilia (IT)

(73) Assignee: TECOMEC S.R.L., Reggio Emilia (IT)

(*) Notice: Subject to any disclaimer, the term of this patent is extended or adjusted under 35 U.S.C. 154(b) by 294 days.

(21) Appl. No.: 14/402,571

(22) PCT Filed: May 31, 2012

(86) PCT No.: PCT/IT2012/000161
§ 371 (c)(1),
(2), (4) Date: Nov. 26, 2014

(87) PCT Pub. No.: WO2013/179318
PCT Pub. Date: Dec. 5, 2013

(65) Prior Publication Data
US 2015/0101199 A1    Apr. 16, 2015

(51) Int. Cl.
*A01D 34/416* (2006.01)

(52) U.S. Cl.
CPC .................. *A01D 34/4166* (2013.01)

(58) Field of Classification Search
CPC ............. A01D 34/4166; A01D 34/416; A01D 34/4163; Y10T 29/49826; Y10T 29/49838
USPC .............. 30/276, 347; 56/12.7, 295
See application file for complete search history.

(56) References Cited

U.S. PATENT DOCUMENTS

| | | | | |
|---|---|---|---|---|
| 4,024,635 A * | 5/1977 | Mizuno | ............... | A01D 34/4161 30/276 |
| 4,137,694 A * | 2/1979 | Hopper | ............... | A01D 34/416 30/276 |
| 4,250,623 A * | 2/1981 | Pittinger | ............... | A01D 34/416 30/347 |
| 4,411,069 A * | 10/1983 | Close | ............... | A01D 34/4161 30/276 |
| 4,490,910 A * | 1/1985 | Mattson | ............... | A01D 34/416 30/276 |
| 4,561,180 A * | 12/1985 | Pittinger, Sr. | ...... | A01D 34/4163 30/276 |
| 8,745,880 B2 | 6/2014 | Kato | | |
| 2012/0126051 A1 | 5/2012 | Legrand | | |
| 2012/0255182 A1* | 10/2012 | Kato | ............... | A01D 34/4166 30/347 |
| 2015/0230401 A1* | 8/2015 | Legrand | ............ | A01D 34/4161 30/276 |

FOREIGN PATENT DOCUMENTS

EP    2454929 A1    5/2012
EP    2517547 A1    10/2012

* cited by examiner

*Primary Examiner* — Ghassem Alie
(74) *Attorney, Agent, or Firm* — Pearne & Gordon LLP (57) ABSTRACT

A head for hedge trimmer includes an external casing intended to rotate around an axis of rotation and equipped with at least one lateral exit hole for a cutting wire, the external casing internally presents a seating for the storage of a part of the cutting wire so that an end portion of the wire exits from the casing through a lateral hole. The head further includes, within the seating, a pair of presser discs facing each other and defining between them an annular shaped housing to contain part of the cutting wire. The presser elements are movable towards each other along the axis of rotation for compressing between them the part of the cutting wire stored between them.

9 Claims, 13 Drawing Sheets

HEAD FOR A LINE HEDGE TRIMMER

TECHNICAL FIELD

The present invention relates to a head for hedge trimmers.

As is known, hedge trimmers are normally used in gardening for cutting excess vegetation, weeds, etc., and are particularly suitable for use on uneven or unlevel ground or that is not easily reachable by mowing machines equipped with wheels. Hedge trimmers can be worn by a user and generally comprise a rod to be worn by the user, an internal combustion engine and a cutting head applied to the lower end of the rod.

The head carries within it one or more skeins of cutting wire, wound onto respective support reels, whose ends exit from lateral opposite holes and to which the centrifugal force generated by the strong rotation of the head confers cutting properties.

The presence of the reel of cutting wire inside the head allows the worn ends of the wire to be replaced with new portions unwound each time from the reel, following manual intervention or activation of automatic release systems of sections of wire.

Disadvantageously, it has been noted that the cutting heads of the known type, loaded with a reel of cutting wire, have substantial dimensions and, also where lowered heads with a shorter height have been designed, the dimensions cannot be reduced as much as would be desirable due to the minimum dimensions of the cutting wire reels used.

Furthermore, heads loaded with a reel of cutting wire can have disadvantages during the operation of the hedge trimmer.

In fact, it can happen that the reel of wire becomes twisted inhibiting the subsequent exit of the wire itself from the head.

There are also solutions that provide for the loading into the head of a chunk of cutting wire which, after disassembling the head, is inserted inside it with its ends exiting from special lateral holes in the head. The reassembly of the latter blocks the wire gripping it in position in correspondence with the central section. In this configuration, no wire is stored in the head but, on the contrary, in the event of needing to replace the wire it is necessary to disassemble the head every time, manually unwind the chunk of wire, insert a new chunk and reassemble the head. Therefore, disadvantageously, these systems are less practical to use and require laborious manual intervention every time it is necessary to replace the cutting wire.

OBJECT OF THE INVENTION

The technical task of the present invention is therefore to provide a head for a hedge trimmer which overcomes the disadvantages of the known art described above.

The object of the present invention is to provide a head for a hedge trimmer which is highly practical to use, with particular reference to the reintegration of the cutting wire, and, at the same time, with reduced dimensions.

The stated technical task and the specified object are substantially reached by a hedge trimmer head with the characteristics expressed in one or more of the appended claims.

BRIEF DESCRIPTION OF THE DRAWINGS

Further characteristics and advantages of the present invention will become more apparent from the following indicative, and hence non-limiting, description of a preferred, but not exclusive, embodiment of a head for a hedge trimmer, as illustrated in the appended drawings, in which.

DETAILED DESCRIPTION OF THE PREFERRED EMBODIMENTS OF THE INVENTION

In accordance with FIGS. 1-5, 1 denotes in its entirety a head for hedge trimmers in accordance with a first embodiment of the present invention. Such first embodiment refers to a head of the type with manual replacement of the cutting wire.

Figure 1:
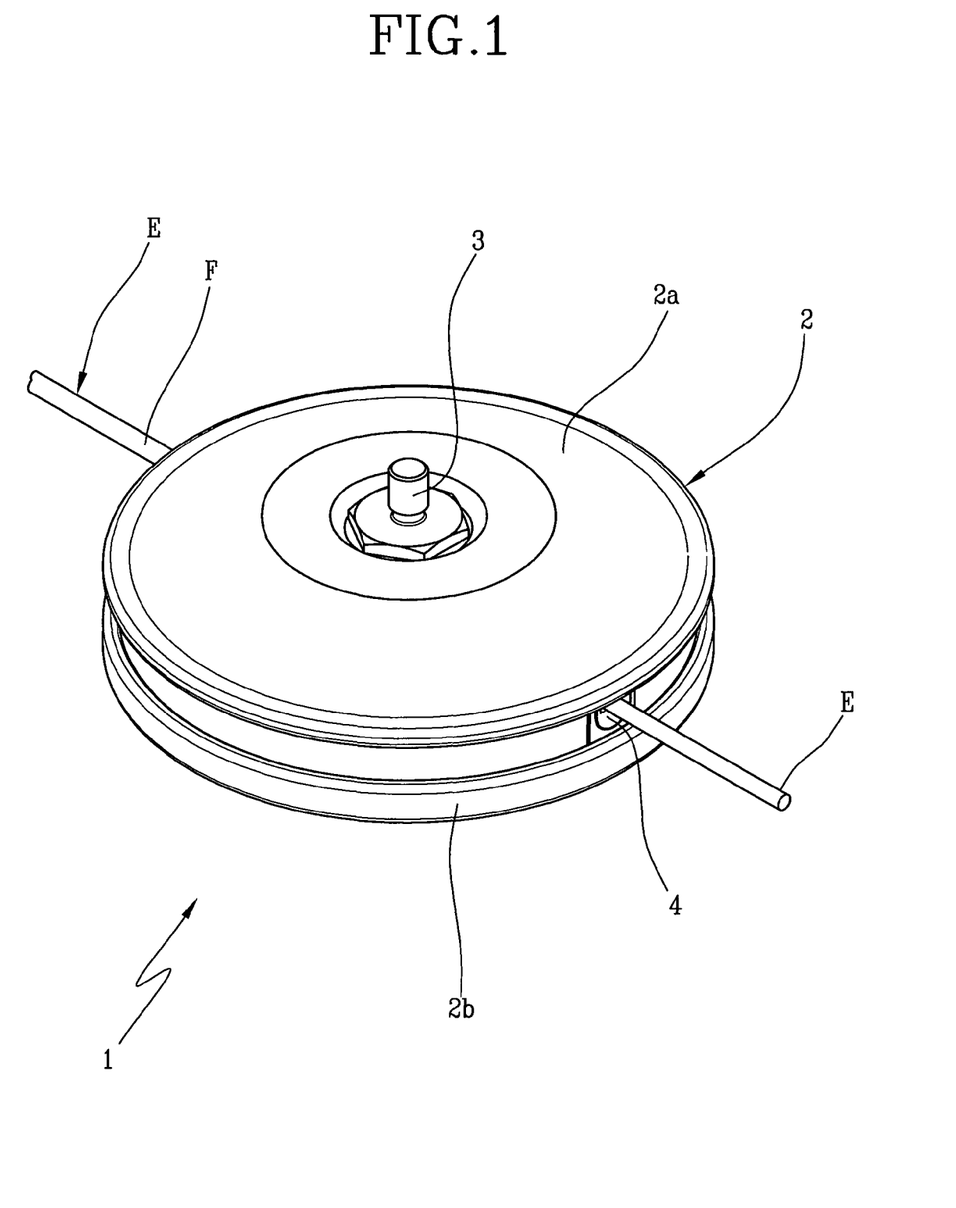
FIG. 1 is a perspective view of a head for a hedge trimmer in accordance with the present invention.

As can be seen in FIG. 1, head 1 comprises an external casing 2 of a substantially cylindrical or discoidal shape around an axis "X" which constitutes the axis of rotation of head 1 when assembled at the lower end of the rod of a hedge trimmer (not illustrated).

The head 1 also has a pin 3 partially inserted inside the casing 2 and partially exiting from it for the grasping and setting in rotation around axis "X" by the (known) gripping means of the hedge trimmer.

Therefore, the axis of rotation "X" of the head is defined by the axis of symmetry of the pin 3.

The casing 2 internally defines a seating for the storage of a part of a cutting wire "F" and laterally (that is transversally with respect to the axis of rotation "X") has at least one opening or a lateral hole 4 so that an end portion "E" of the cutting wire "F" stored inside the casing 2 exits from the casing through the lateral hole 4 (or opening) so as to define the cutting tool of head 1.

It is specified that in the continuation of the present description the term lateral hole, indicated with the numerical reference 4, will be referred indistinctly to both a hole and an opening.

In the illustrated embodiment, the casing 2 has a pair of lateral holes 4 diametrically opposite, from which respective end portions "E" of cutting wires exit.

The casing 2 is defined by a pair of semi-shells 2a, 2b joinable through movement towards each other along the axis of rotation "X".

Between the two semi-shells 2a, 2b two plugs 19 are interposed, each equipped with an opening through which the end "E" of the cutting wire exits.

Advantageously, according to a characterising aspect of the invention, inside the seating defined by the external casing 2 a pair of presser elements 5, 6 is arranged, facing each other and defining between them an annular shaped housing 7, that is toroidal, for the containment of a part of the cutting wire. Furthermore, advantageously, the presser elements 5, 6 are movable towards each other along the axis of rotation "X" so as to compress between them the mentioned part of cutting wire stored between them.

Figure 11:
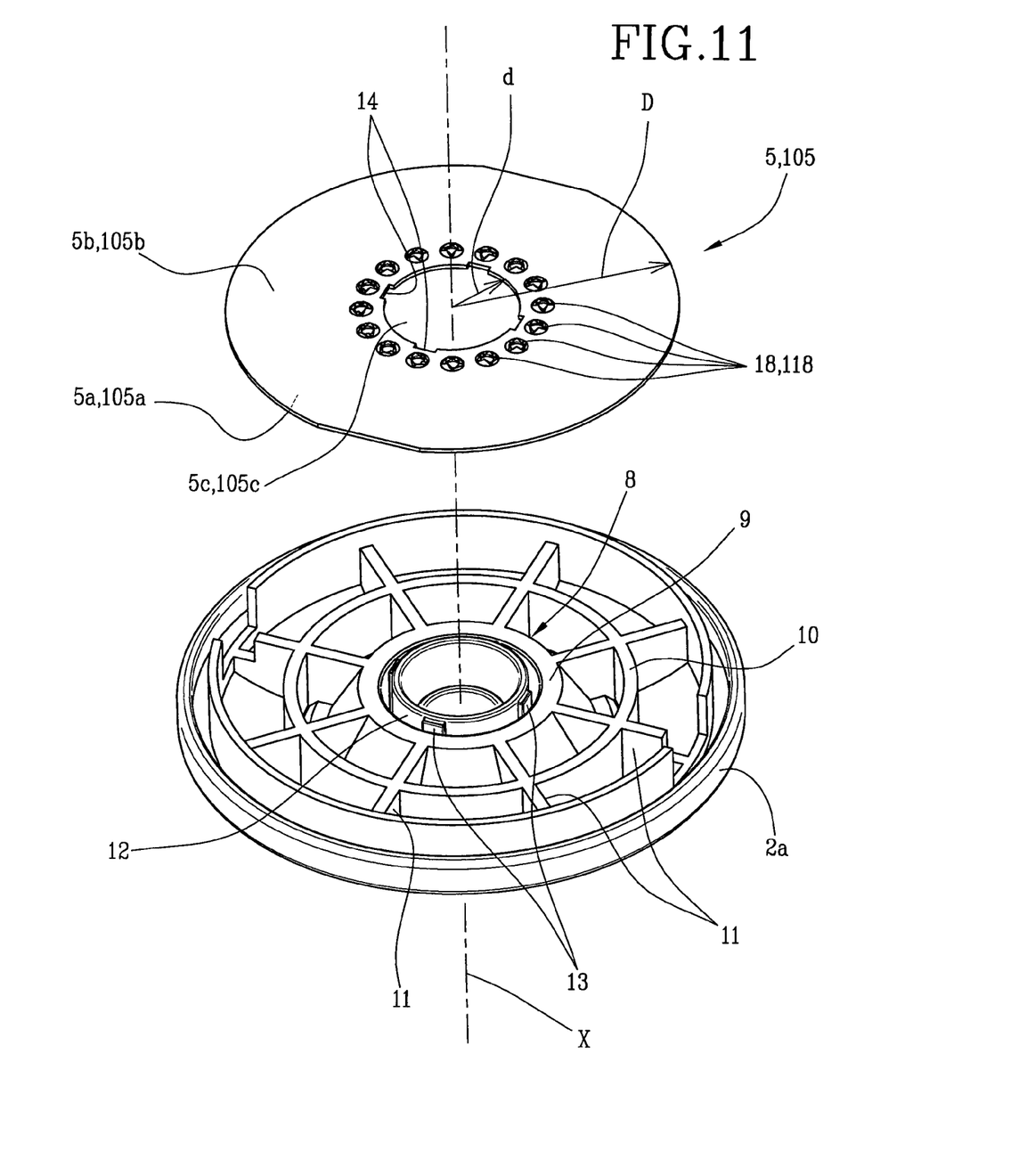
FIG. 11 is an exploded perspective view of a first group of components of the head of FIG. 1 in the first embodiment.

Preferably, the housing 7 extends around the axis of rotation "X" between a circumference of minimum diameter "d" and a circumference of maximum diameter "D", shown in FIG. 11. Advantageously, each of the presser elements 5, 6 has at least one portion which extends radially, that is, moving away from the axis of rotation "X", between the circumferences of minimum diameter (d) and maximum diameter (D).

In principle, the presser elements 5, 6 can be of any shape, as long as the mentioned portion extending between the circumferences of minimum diameter (d) and maximum diameter (D) can be obtained.

In the embodiment illustrated in FIGS. 2-5 and 11, the presser elements 5, 6 have a full annular shape, that is, discoidal equipped with a central hole 5c, 6c, with two opposing and staggered flat surfaces along the axis of rotation "X". A first surface 5a, 6a, of each presser element 5, 6, facing the other presser element hence rests in a perpendicular plane to the axis of rotation "X", defining a constant thickness of the housing 7.

Each presser element 5, 6, therefore has a second surface 5b, 6b, facing a corresponding semi-shell 2a, 2b and, preferably, this is also flat and parallel to the first surface 5a, 6a.

Figure 17:
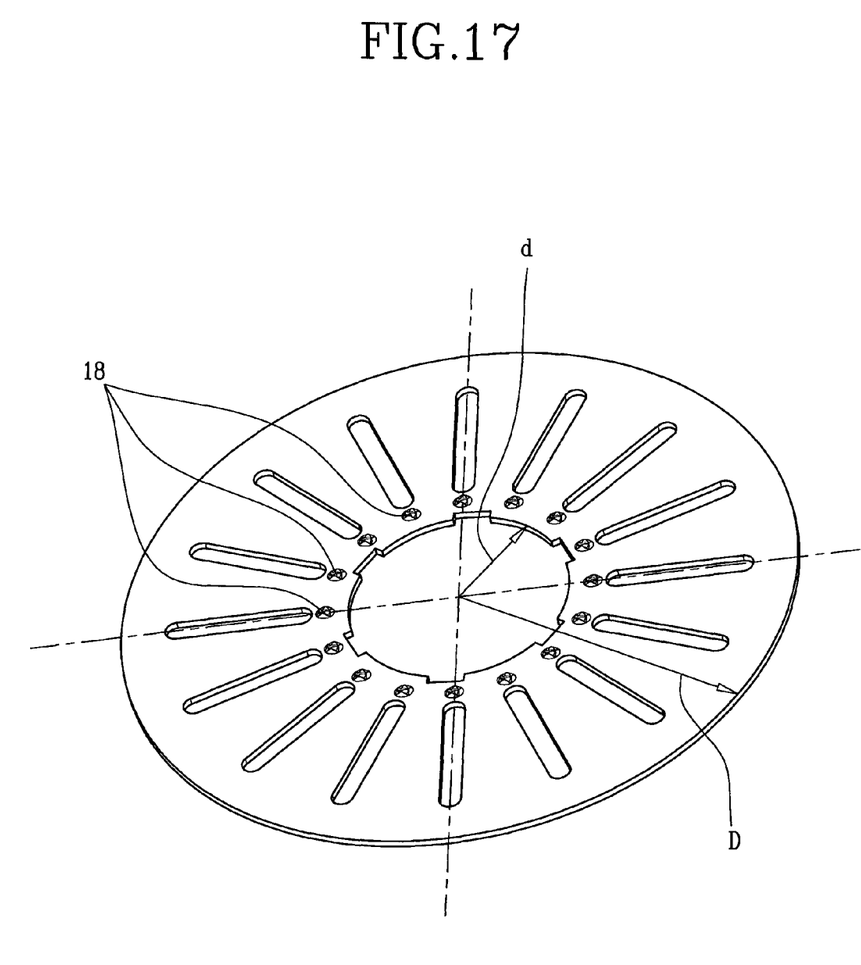
FIG. 17 is a perspective view of a variation of a component of the head of FIG. 1 in the first embodiment.

A further embodiment of the presser elements is illustrated in FIG. 17, which represents a single presser element 5 specifying the identity to the other presser element 6.

With reference to the aforementioned presser element 5, the latter has an annular shape equipped with a central hole 5c and a plurality of lightenings 5d.

As previously described the aforementioned presser element 5 envisages a first surface 5a and a second surface 5b, opposite to the previous one.

The plurality of lightenings 5d, obtained radially between the two surfaces 5a, 5b, is equitably distributed on the annular shape of the presser element.

In the embodiments equipped with two presser elements 5 and 6, each first surface 5a, 6a, is facing the other presser element defining a constant thickness of the housing 7.

In such embodiments the respective plurality of lightenings 5d, 6d are staggered from each other so that a respective lightening is facing a respective full portion of the corresponding presser element.

In this way, when the presser elements intercept between them at least one cutting wire F, they deform the cutting wire defining, through the plurality of lightenings, binding areas against the wire itself.

In other words a portion of the cutting wire F is deformed by binding against a longitudinal portion of the lightenings.

In the embodiments equipped with a single presser element 5, the first surface 5a faces the cutting wire F whereas the second surface 5b faces a respective semi-shell 2a, 2b.

Also in this case, by exploiting the deformability of the cutting wire F and the pressure generated by the presser element 5 and the pair of semi-shells, the lightenings 5d generate binding areas of the cutting wire keeping it in position. Each semi-shell 2a, 2b, has a central thrust portion 8 abuttable onto a corresponding presser element 5, 6, and in particular onto its second surface 5b, 6b. Said central thrust portion 8 is preferably defined by at least one circular rib (9, 10), preferably two ribs, arranged around the axis of rotation "X" and coaxial with it, as can be seen in FIGS. 2-5 and 11.

Furthermore, preferably, each semi-shell 2a, 2b, also has a plurality of radial ribs 11 extending from the circular rib 9 moving away from the axis of rotation (X), and adapted to exert pressure on the second surface 5b, 6b of the corresponding presser element (5, 6).

Each semi-shell 2a, 2b, is connected to the respective presser element 5, 6 rotationally integral with respect to the axis of rotation "X", that is, so as to prevent mutual rotation between semi-shell 2a, 2b and presser element 5, 6 around the axis "X". Preferably, this is obtained through a grooved connection between the central hole 5c, 6c, of the presser element 5, 6 and a central sleeve 12 of the semi-shell 2a, 2b, extending along axis "X".

This grooved coupling, in the embodiment illustrated in FIG. 11, is defined by the coupling between lateral teeth 13 obtained on the sleeve 12 and corresponding notches 14 obtained on the presser element 5, 6, in correspondence with the central hole 5c, 6c.

Furthermore, also the semi-shells 2a, 2b, are integral in rotation with each other around the axis of rotation "X".

The head 1 also comprises clamping means provided to generate movement towards each other of the presser elements 5, 6, so as to clamp between the presser elements 5, 6 the part of the cutting wire stored between them.

In the embodiment of FIGS. 2-5, the clamping means comprise a threaded connection acting between the two semi-shells 2a, 2b, so as to clamp the semi-shells 2a, 2b to each other, in a packed configuration in which the semi-shells 2a, 2b, keep said presser elements close to each other.

Figure 2:
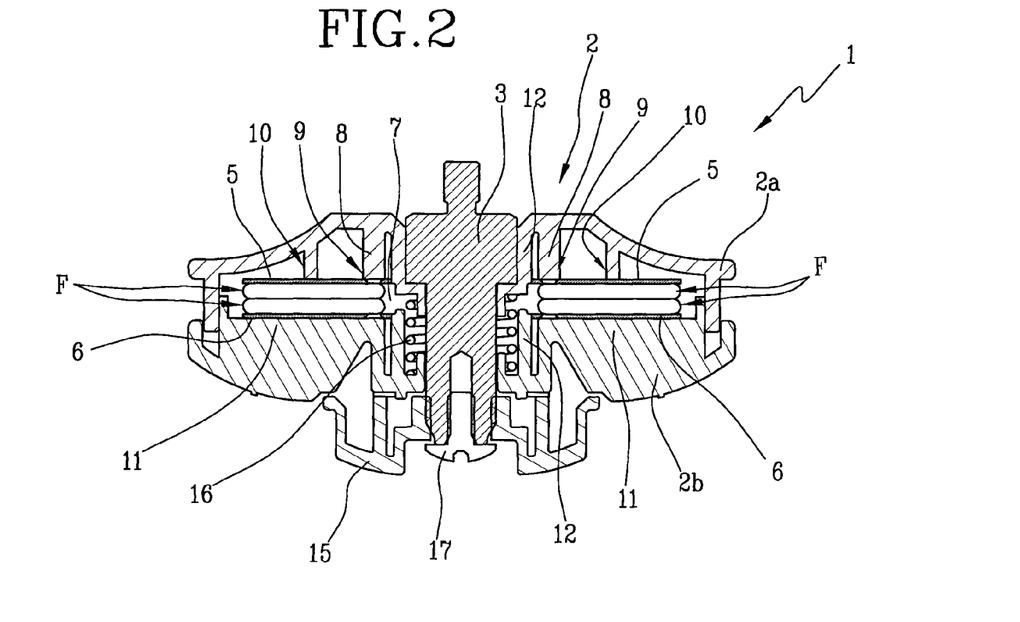
FIGS. 2 and 3 are sectional representations, according to two different perpendicular planes passing through the axis of rotation of the head, of the head of FIG. 1 in a first embodiment.
Figure 3:
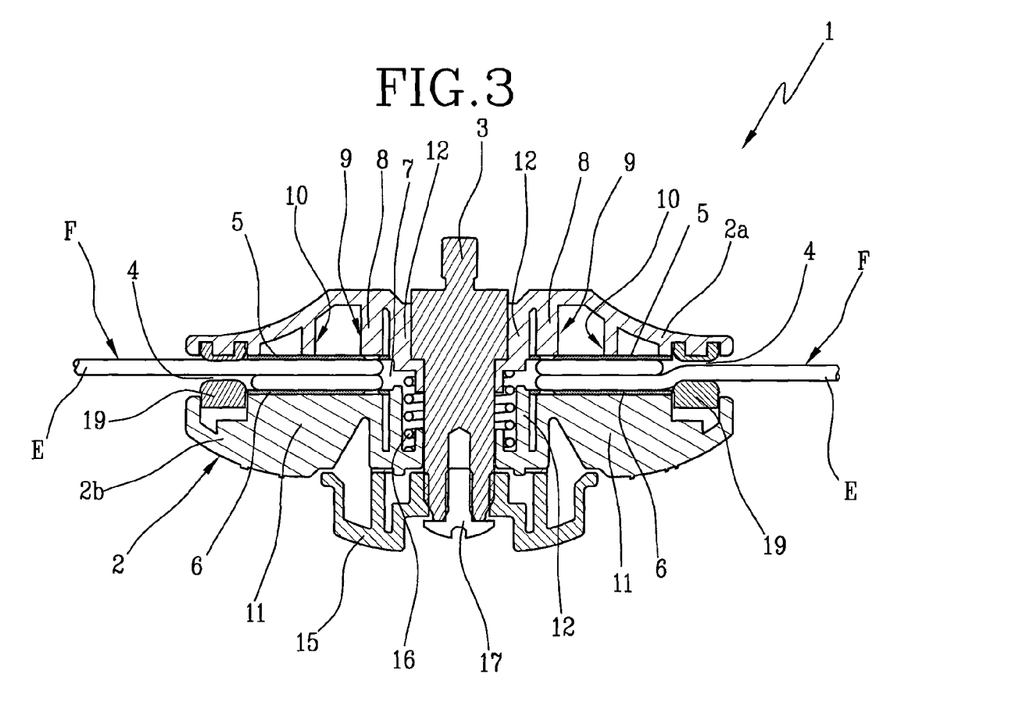

The threaded connection, as can be seen in FIGS. 2 and 3, exploits the pin 2 of head 1, which generates an undercut on the first semi-shell 2a and extends up to the second semi-shell 2b exiting from it by engaging, through screwing, with a clamping knob 15 which grips onto the second semi-shell 2b. In this way the clamping of knob 15 generates the movement towards each other of the two semi-shells 2a, 2b, which press on the presser elements 5, 6, clamping the cutting wire arranged between them.

Preferably, in the current embodiment the clamping means also comprise a compression spring 16 interposed between the two semi-shells 2a, 2b, so as to keep sufficient tension on the aforementioned threaded connection, preventing the latter from coming loose during the operative rotation of head 1.

Figure 4:
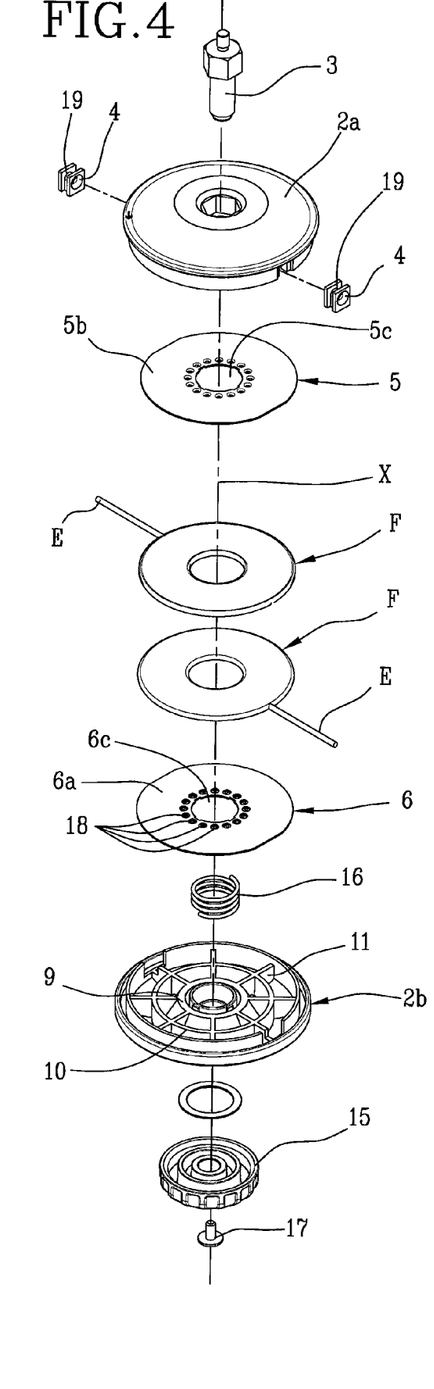
FIGS. 4 and 5 are two different exploded perspective views of the head of FIG. 1 in the first embodiment.
Figure 5:
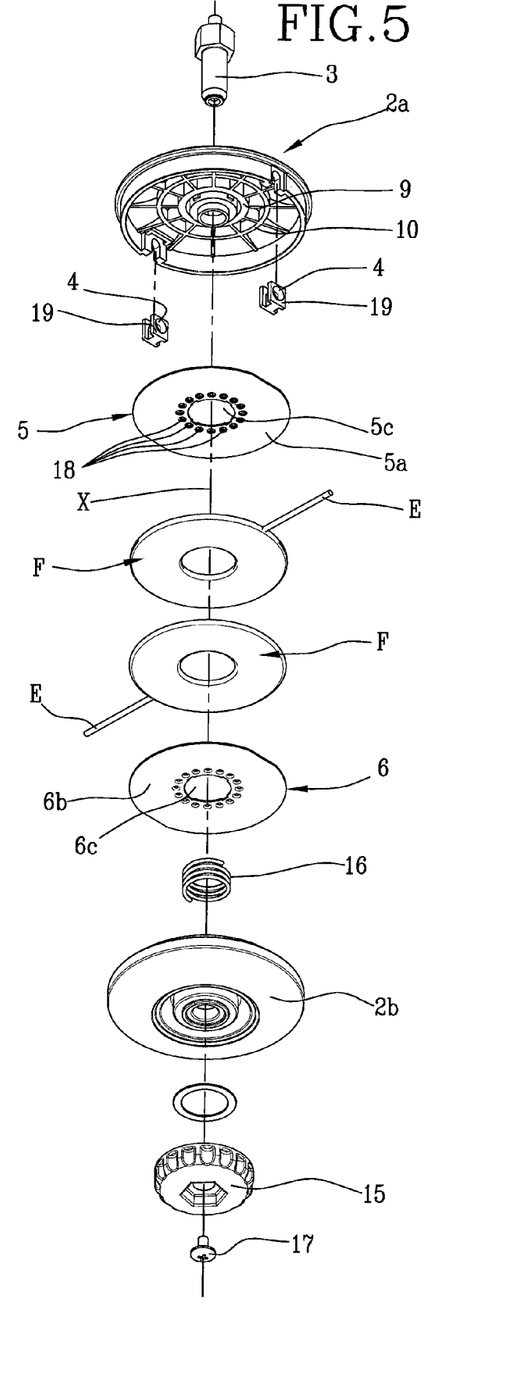

Preferably, as can be seen in the exploded views in FIGS. 4 and 5 and even better in FIG. 11, each presser element 5, 6, has, on its own portion nearest to the axis of rotation "X"

and facing the other presser element 5, 6 (hence on its own first surface 5a, 6a), a plurality of areas of increased adherence 18 so as to increase a gripping action exerted by the presser element 5, 6 on the part of the cutting wire contained in housing 7.

In the illustrated embodiment, the mentioned areas of increased adherence 18 comprise a plurality of areas locally deformed of the presser element 5, 6, which define sharp edges extending along the axis of rotation "X" towards the other presser element 5, 6.

Preferably, the areas of increased adherence 18 are angularly distributed around the axis of rotation "X" and, in line with the above description, they are located near or at the central hole 5c, 6c, of the presser element 5, 6.

In use, in the event of needing to reintegrate the cutting ends of the cutting wire with new chunks, the operator must stop the rotation of head 1, release the threaded connection by unscrewing the knob 15, then loosen the compression between the two semi-shells so as to allow the manual extraction of a part of the cutting wire previously stored in casing 2 of head 1, then cut the worn ends "E" of the cutting wire and clamp the two semi-shells 2a, 2b again, by acting on the knob 15.

Figure 6:
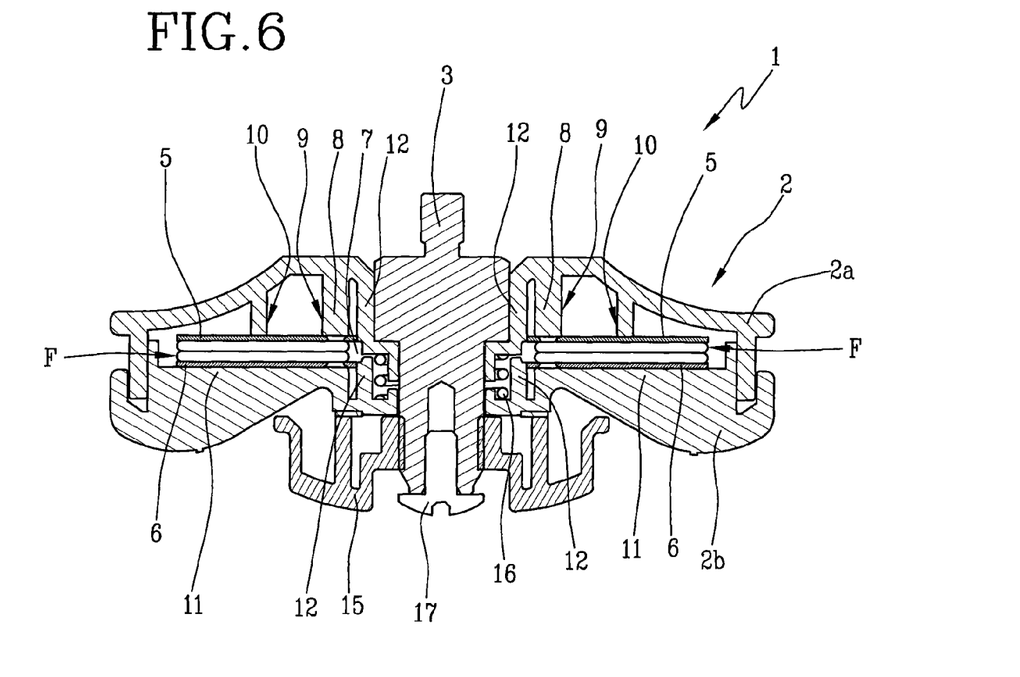
FIGS. 6 and 7 are sectional representations, according to two different perpendicular planes passing through the axis of rotation of the head, of the head of FIG. 1 in a second embodiment.
Figure 7:
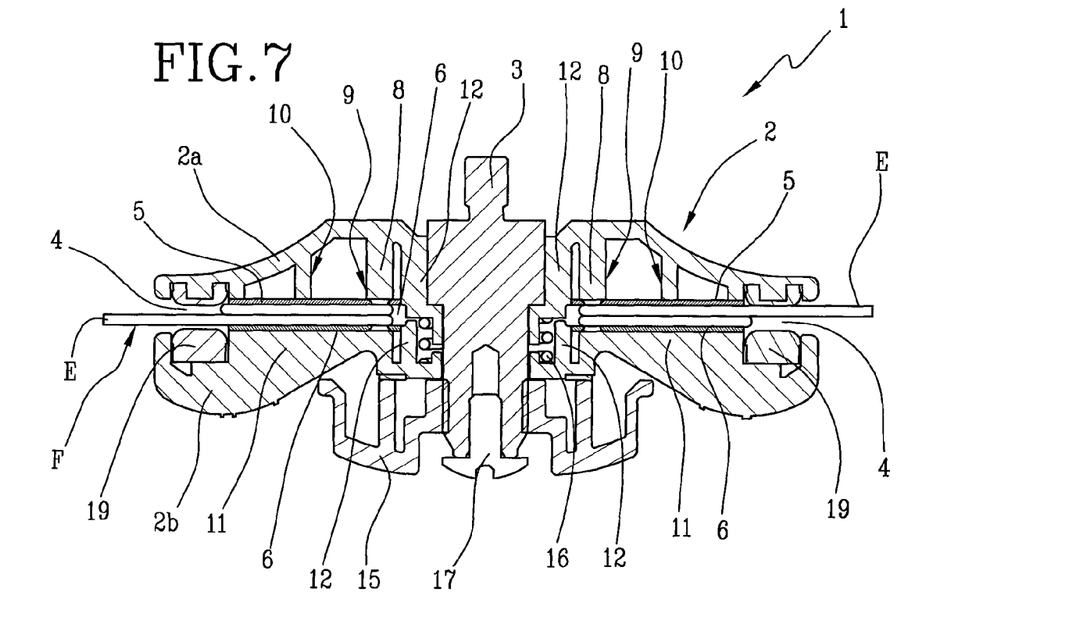

FIGS. 6 and 7 show a different embodiment of head 1 but structurally similar to that described above and illustrated in FIGS. 2-5. In particular, this embodiment differs from the previous one in that the second semi-shell 2b, that is, the one facing the ground during the use of the hedge trimmer, has a cavity facing the ground provided to contain at least partially the knob 15 so as to reduce the axial dimensions of head 1.

The remaining characteristics of head 1 remain unvaried with respect to the embodiment of FIGS. 2-5 and, therefore, FIGS. 6-7 use the same reference numbers to identify the same structural components as FIGS. 2-5.

Figure 8:
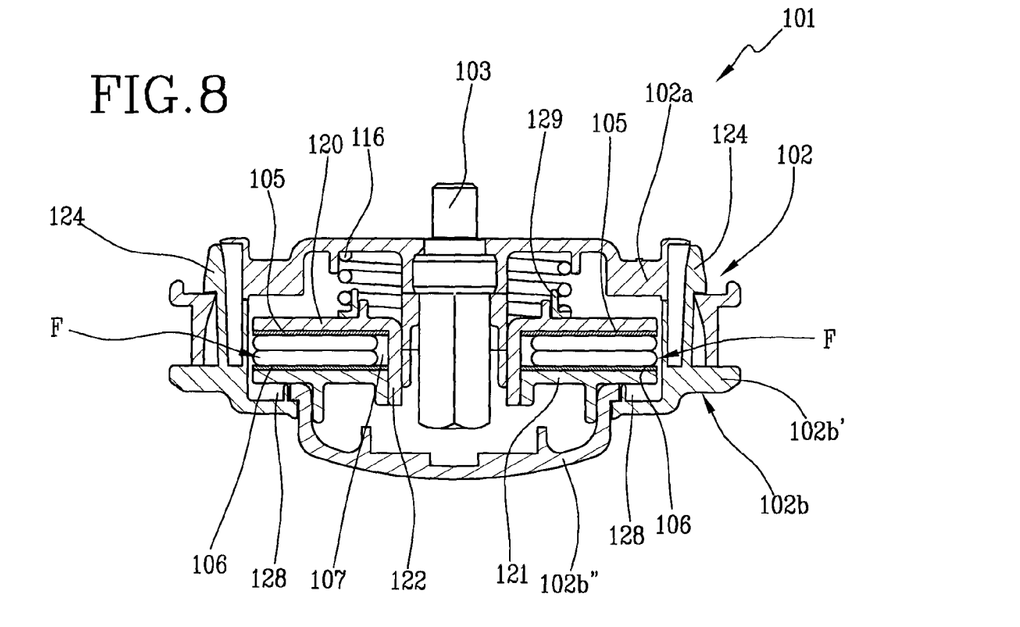
FIGS. 8 and 9 are sectional representations, according to two different perpendicular planes passing through the axis of rotation of the head, of the head of FIG. 1 in a third embodiment.
Figure 9:
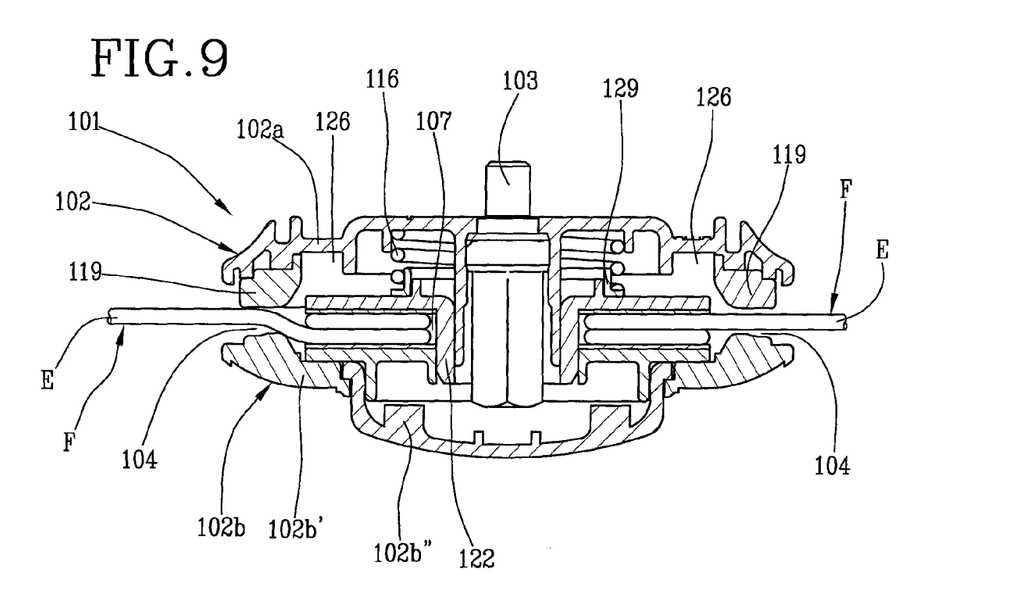
Figure 10:
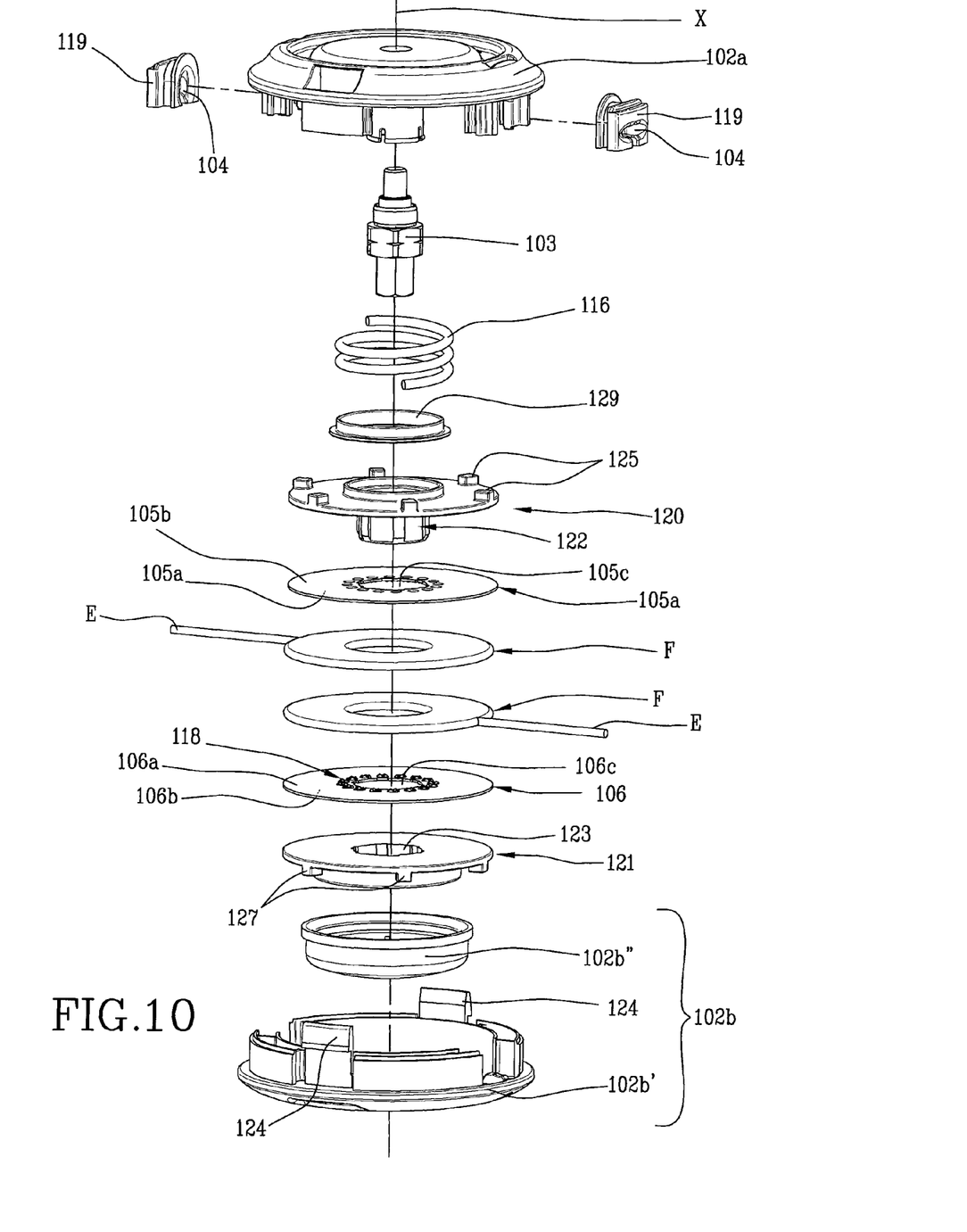
FIG. 10 is an exploded perspective view of the head of FIG. 1 in the third embodiment.

FIGS. 8-10 show a third embodiment of the present invention. Such third embodiment refers to a head of the type with automatic replacement of the cutting wire, so called "tap-and-go".

In the description of this embodiment, corresponding elements to the elements already described for the first embodiment will be associated with the same numbers to which "100" will be added.

Also in this embodiment, head 101 comprises an external casing 102 of a substantially cylindrical or discoidal shape around an axis "X" which constitutes the axis of rotation of the head 101 when assembled at the lower end of the rod of a hedge trimmer (not illustrated).

The head 101 also has a pin 103 partially inserted inside the casing 102 (also in this case in accordance with FIG. 1) and partially exiting from it for the grasping and setting in rotation around axis "X" by the (known) gripping means of the hedge trimmer.

Therefore, the axis of rotation "X" of the head is defined by the axis of symmetry of the pin 103.

The casing 102 internally defines a seating for the storage of a part of a cutting wire "F" and laterally (that is transversally with respect to the axis of rotation "X") has at least one lateral hole 104 so that an end portion "E" of the cutting wire "F" stored inside the casing 102 exits from the casing through the lateral hole 104 so as to define the cutting tool of head 101.

In accordance with the illustrated embodiment, the casing 102 has a pair of lateral holes 104 diametrically opposite, from which respective end portions "E" of cutting wires exit.

The casing 102 is defined by a pair of semi-shells 102a, 102b joinable through movement towards each other along the axis of rotation "X".

In this embodiment, however, the second semi-shell 102b (that is, the one arranged on the side of head 101 intended to face the ground) has a peripheral portion 102b' that can be permanently associated with the first semi-shell 102a and a central portion 102b", applied slidably to the peripheral portion 102b' to slide with respect to the latter along the axis of rotation "X".

As can be seen in FIG. 10, the central portion 102b" has a cap conformation. Furthermore, the first semi-shell 102a and the peripheral portion 102b' of the second semi-shell 102b are rotationally integral around the axis of rotation "X", in particular through a pair of snap teeth 124 visible in FIG. 8.

Between the two semi-shells 102a, 102b two plugs 119 are interposed, each equipped with an opening through which the end "E" of the cutting wire exits. Advantageously, according to a characterising aspect of the invention, inside the seating defined by the external casing 102 a pair of presser elements 105, 106 is arranged, facing each other and defining between them an annular shaped housing 107, that is toroidal, for containing a part of the cutting wire. Furthermore, advantageously, the presser elements 105, 106 are movable towards each other along the axis of rotation "X" so as to compress between them the mentioned part of cutting wire stored between them.

Also in this embodiment, the housing 107 extends around the axis of rotation "X" between a circumference of minimum diameter "d" and a circumference of maximum diameter "D", shown in FIG. 11 (although FIG. 11 refers specifically to the first or second embodiment, the presser element 5 shown in it is identical to the presser element of the third embodiment).

Advantageously, each of the presser elements 105, 106 has at least one portion which extends radially, that is, moving away from the axis of rotation "X", between the circumferences of minimum diameter (d) and maximum diameter (D).

In principle, the presser elements 105, 106 can be of any shape, as long as the mentioned portion extending between the circumferences of minimum diameter (d) and maximum diameter (D) can be obtained.

Also in this embodiment, the presser elements 105, 106 have a full annular shape, that is, discoidal equipped with a central hole 105c, 106c, with two opposing and staggered flat surfaces along the axis of rotation "X". A first surface 105a, 106a, of each presser element 105, 106, facing the other presser element hence rests in a perpendicular plane to the axis of rotation "X", defining a constant thickness of the housing 107.

Each presser element 105, 106 also has a second surface 105b, 106b, facing a corresponding semi-shell 102a, 102b.

Preferably, the presser elements 105, 106 of the current embodiment have, on their own portion nearest to the axis of rotation "X" and facing the other presser element 105, 106 (therefore on their own first surface 105a, 106a), a plurality of areas of increased adherence 118 to increase a gripping action exerted by the presser element 105, 106 on the part of cutting wire contained in housing 107. This is similar to what has already been described for the other two embodiments and the configuration illustrated in FIG. 11.

In particular, the mentioned areas of increased adherence 118 comprise a plurality of areas locally deformed by the presser element 105, 106, which define sharp edges extending along the axis of rotation "X" towards the other presser element 105, 106.

Preferably, the areas of increased adherence 118 are angularly distributed around the axis of rotation "X" and, in line with the above description, they are located near or at the central hole 105c, 106c, of the presser element 105, 106.

Inside the external casing 2 a pair of auxiliary discs 120, 121 is also arranged, each abuttable resting against the aforementioned second surface 105b, 106b of a respective presser element 105, 106.

A first auxiliary disc 120 rests against the second surface 105b of the first presser element 105 whereas the second auxiliary disc 121 rests against the second surface 106b of the second presser element 106.

Preferably, the auxiliary discs 120, 121 each have an annular portion in a discoidal shape overlappable with the respective presser element 105, 106.

Furthermore, the first auxiliary disc 120 has a central sleeve portion 122 which extends along the axis of rotation "X" and is inserted, through a grooved coupling, in a central hole 123 obtained in the second auxiliary disc 121, so as to allow mutual translation between the two auxiliary discs 120, 121 along the axis of rotation "X" but not mutual rotation.

The head 1 also comprises clamping means provided to generate movement towards each other of the presser elements 105, 106, so as to clamp between the presser elements 105, 106 the part of the cutting wire stored between them.

In the current embodiment, the clamping means comprise a compression spring 116 interposed between the first semi-shell 102a and the respective first auxiliary disc 120. Preferably, a bowl 129 is interposed between the spring 116 and the first auxiliary disc 120.

Hence the compression spring 116 keeps the first auxiliary disc 120 pressed, and along with it, the first presser element 105, against the cutting wire stored in the housing 107 which, from the opposite part, unloads said compression action on the second presser element 106, which presses against the second auxiliary disc 121.

In turn, the second auxiliary disc 121, in correspondence with its own peripheral portion, strikes against the second semi-shell 102b, in particular against the peripheral portion 102b' and/or against the central portion 102b" of the second semi-shell 102b.

It ensues that said central portion 102b" is activatable, through lifting if the orientation of FIGS. 8 and 9 is observed, in translation against the second auxiliary disc 120 and therefore towards the second presser element 105b to move the presser elements 105a, 105b towards the first semi-shell 105a contrasting the thrust action exerted by the spring 116.

Figure 13:
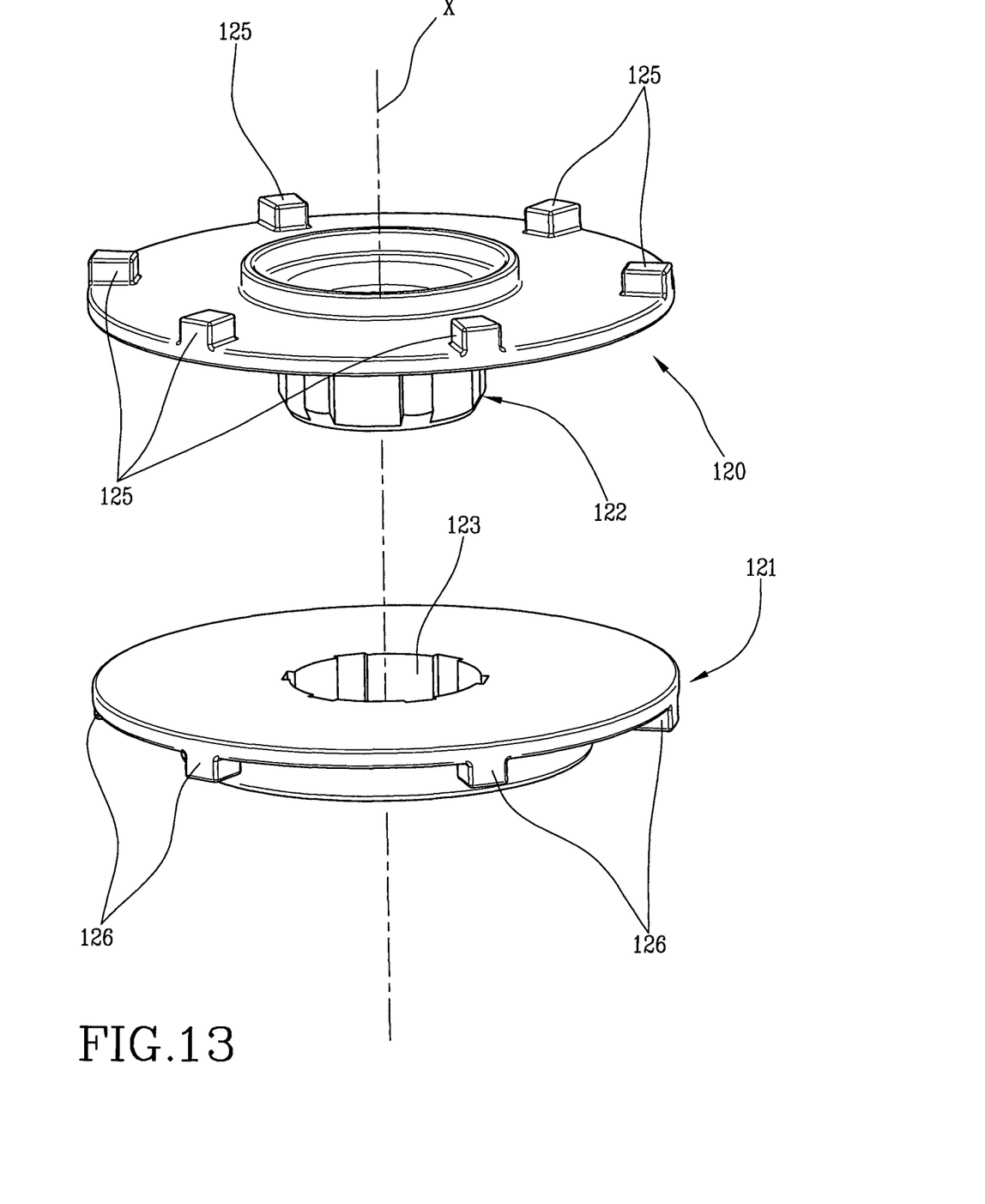
FIGS. 13 and 14 are exploded perspective views, from two different angles, of a second group of components of the head of FIG. 1 in the third embodiment.
Figure 14:
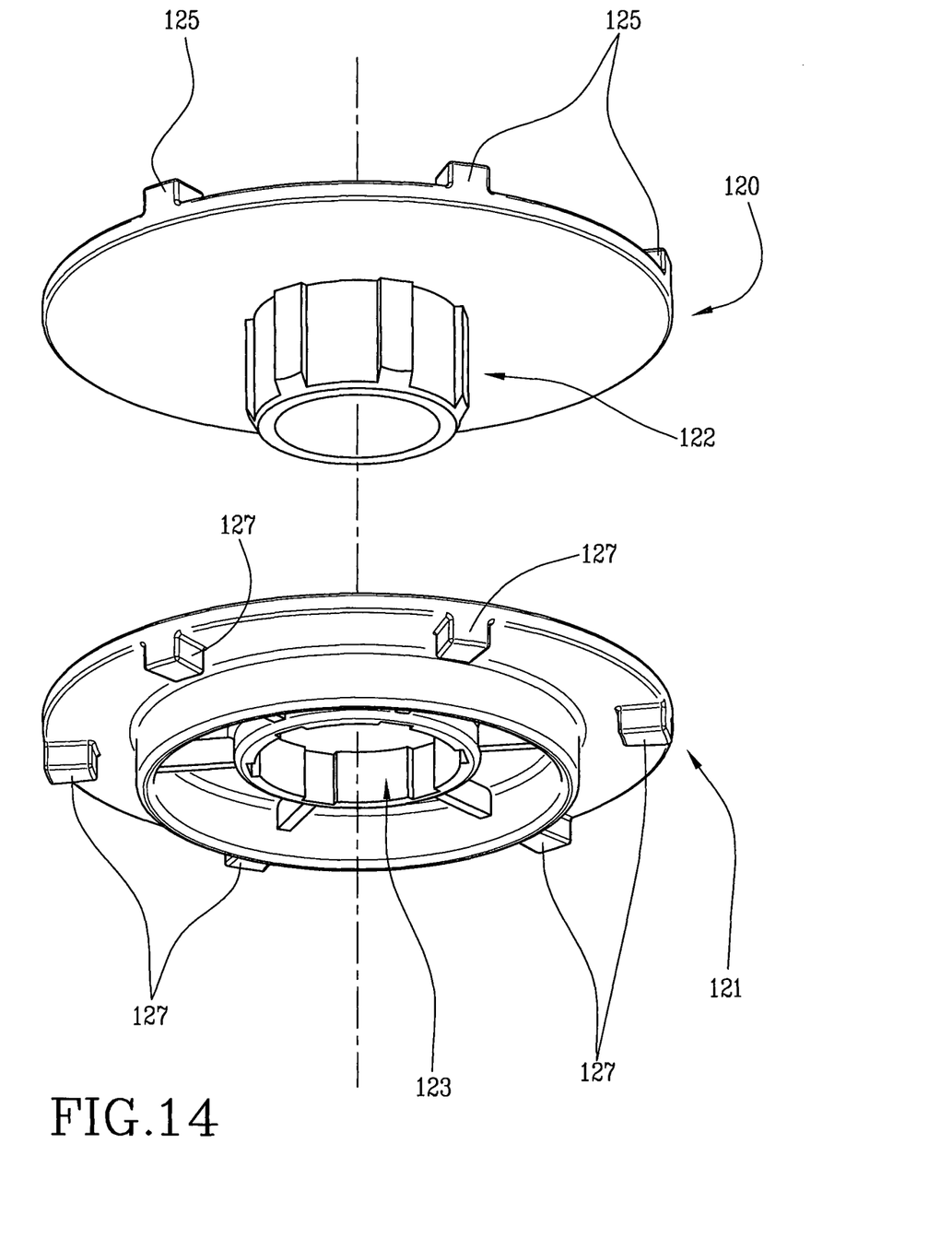
Figure 16:
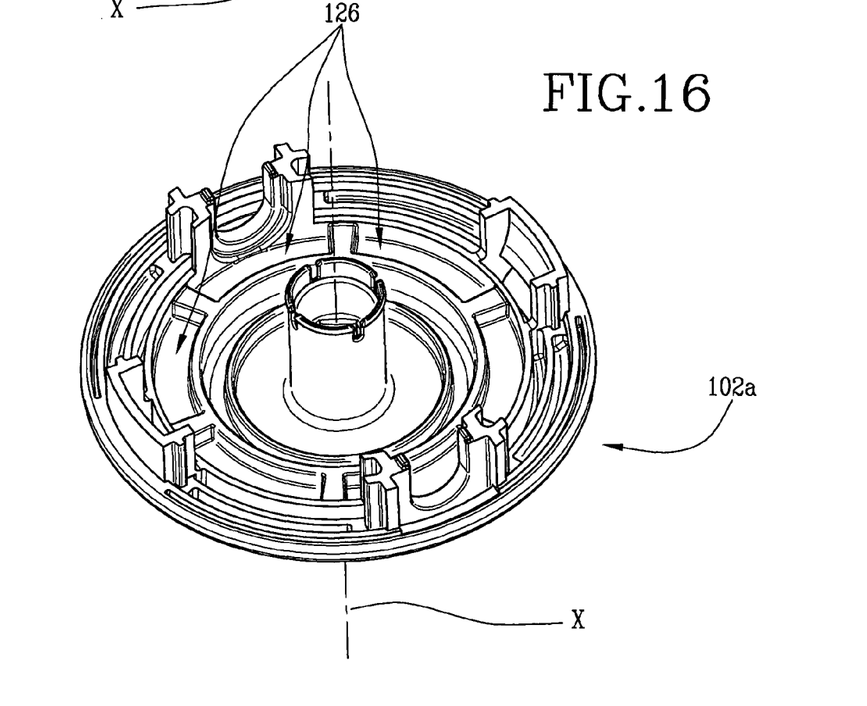
FIG. 16 is a perspective view of a further component of the head of FIG. 1 in the third embodiment.

As can be seen in FIG. 13, the first auxiliary disc 120 has, on a first peripheral portion facing the first semi-shell 105a, a plurality of projections 125 facing the first semi-shell 105a and engageable within respective seatings 126 (visible in FIG. 16) obtained in the first semi-shell 105a.

Figure 15:
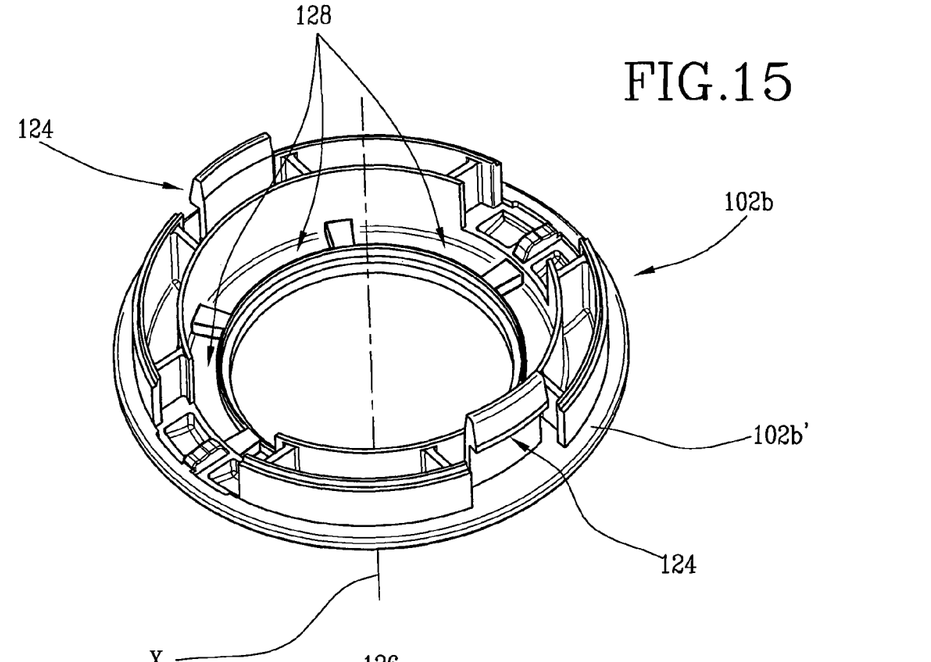
FIG. 15 is a perspective view of a further component of the head of FIG. 1 in the third embodiment.

Likewise, the second auxiliary disc 121 has, on its peripheral portion facing the second semi-shell 106a, a plurality of projections 127 facing the second semi-shell 105b and engageable within respective seatings 128 (visible in FIG. 15) obtained in the peripheral portion 102b' of the second semi-shell 105b.

Preferably, the aforementioned seatings 126, 128 of semi-shells 102a, 102b have a slot shape and have a pre-set angular extension around the axis of rotation "X" so as to allow a predetermined angular movement of each auxiliary disc 120, 121 with respect to the respective semi-shell 102a, 102b around the axis of rotation "X".

Furthermore, the projections 125 of the first auxiliary disc 120 are disengaged from the respective seatings 126 of the first semi-shell 102a when the projections 127 of the second auxiliary disc 121 are engaged within the respective seatings 128 of the second semi-shell 120b. The mentioned projections 125, 127 are engageable in the respective seatings 126, 128 and disengageable, through translation of the auxiliary discs 120, 121 along the axis of rotation "X", in particular by the central portion 102b" of the second semi-shell 102b or by the compression spring 116.

Figures 18, 19:
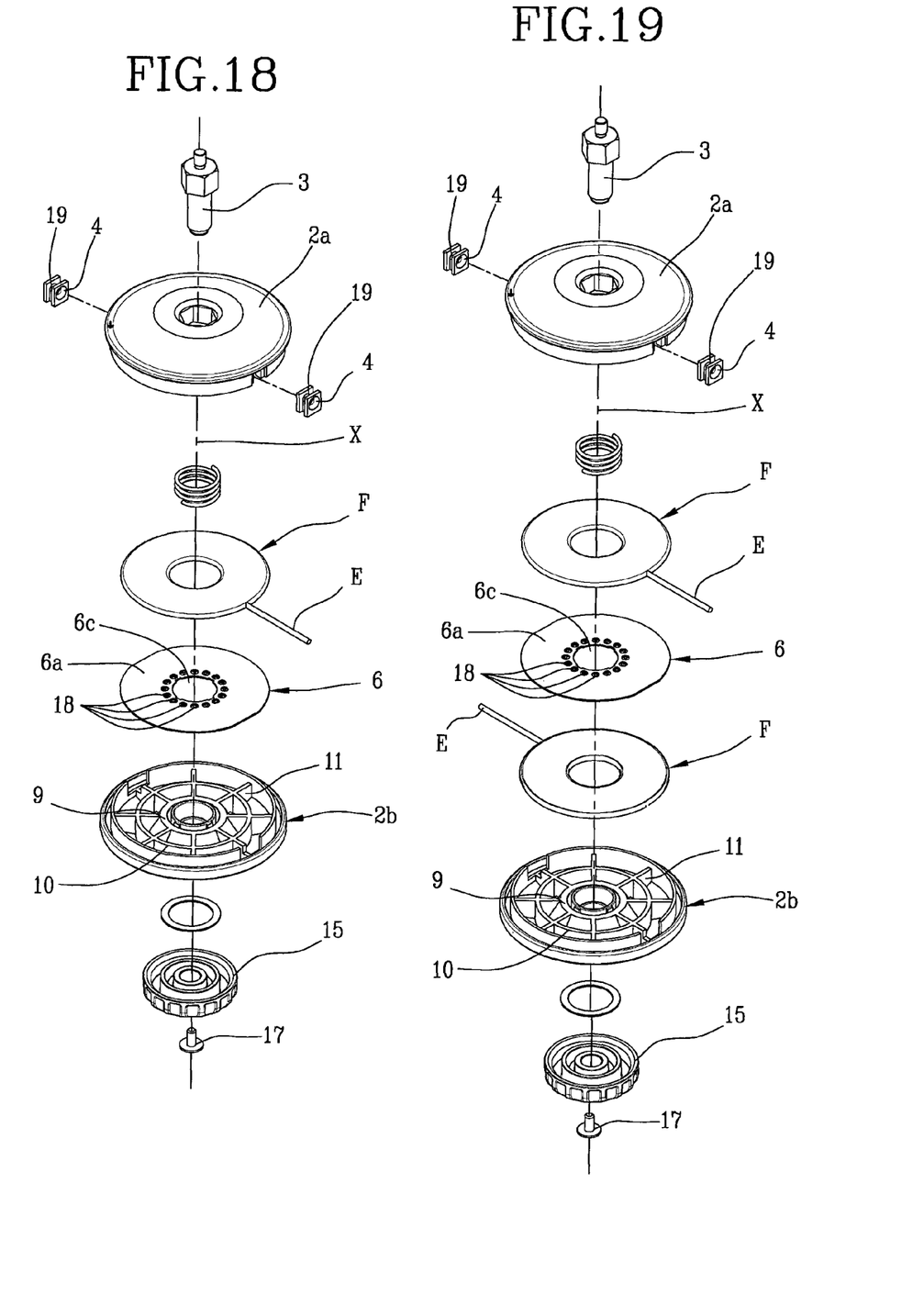
FIG. 18 is an exploded perspective view of the head of FIG. 1 in a fourth embodiment.
FIG. 19 is an exploded perspective view of the head of FIG. 1 in a fifth embodiment.

FIG. 18 illustrates a fourth variation of the head 1 of FIG. 1 with the same components as the first variation with the exception of the pair of presser elements 5, 6.

In fact, said head 1 comprises a single presser element 6, whereas the other presser element 5 is defined by a semi-shell 2a, 2b.

FIG. 19 illustrates a fifth embodiment of the head 1 of FIG. 1 with the same components as the first variation with the exception of the pair of presser elements 5, 6.

In such a variation the pair of presser elements 5, 6 is defined by the pair of semi-shells 2a, 2b integrated by a further presser element 20 interposed between the latter.

Said further presser element 20 performs both the role of striker wall for the pressure exerted by the pair of semi-shells and the role of friction element preventing any slipping between two cutting wires F, F'.

In the configuration of FIG. 19 the first semi-shell 2a presses the cutting wire F against the further presser element 20 and the other semi-shell 2b presses the further cutting wire F' against the same presser element 20. The further presser element 20 prevents any slipping between the cutting wires F and F'.

In use, starting from an identical configuration to that shown in FIG. 8, the lifting of the central portion 102b" of the second semi-shell 102b (obtained for example by pressing or hitting the head 101 on the ground during the operative rotation of the head 101) performs the lifting of the package, comprising:

the two auxiliary discs 120, 121,
the two presser elements 105, 106 and
the cutting wire "F" compressed between them through the spring 116.

This lifting takes place against the thrust of the spring 116.

The lifting described above performs the disengagement of the projections 127 of the second auxiliary disc 121 from the seatings 128 of the second semi-shell 102b. This makes the aforementioned package rotationally independent from the semi-shells 102a, 102b and from the pin 103 and therefore the package can rotate around the axis "X" with respect to the semi-shells 102a, 102b, with release by centrifugal action of a section of cutting wire through the lateral holes 104.

During the lifting of the mentioned package, following the complete disengagement of the projections 127 of the second auxiliary disc 121 from the seatings 128 of the second semi-shell 102b, (after a predetermined time also connected to the excursion of the package along axis "X") the engagement of the projections 125 of the first auxiliary disc 120 in the seatings 126 of the first semi-shell 102a takes place.

This causes a new jamming of the rotation of the package with respect to the semi-shells 102a, 102b which interrupts the release of the cutting wire through the lateral holes 104.

The same thing happens in the subsequent release of the thrust action exerted by the central portion 102b" of the second semi-shell 102*b* with a lowering of the package into the inserted position with the second semi-shell 102*b*.

In all the embodiments described, the presser elements 5, 6, 105, 106 are conformed so as to contain, within the housing 7, 107 formed between them, a cutting wire arranged to strike against the first surfaces 5*a*, 6*a*, 105*a*, 106*a* of the presser elements 5, 6, 105, 106 and configured according to a spiral winding with coils all resting on the same perpendicular plane to the axis of rotation "X".

Figure 12:
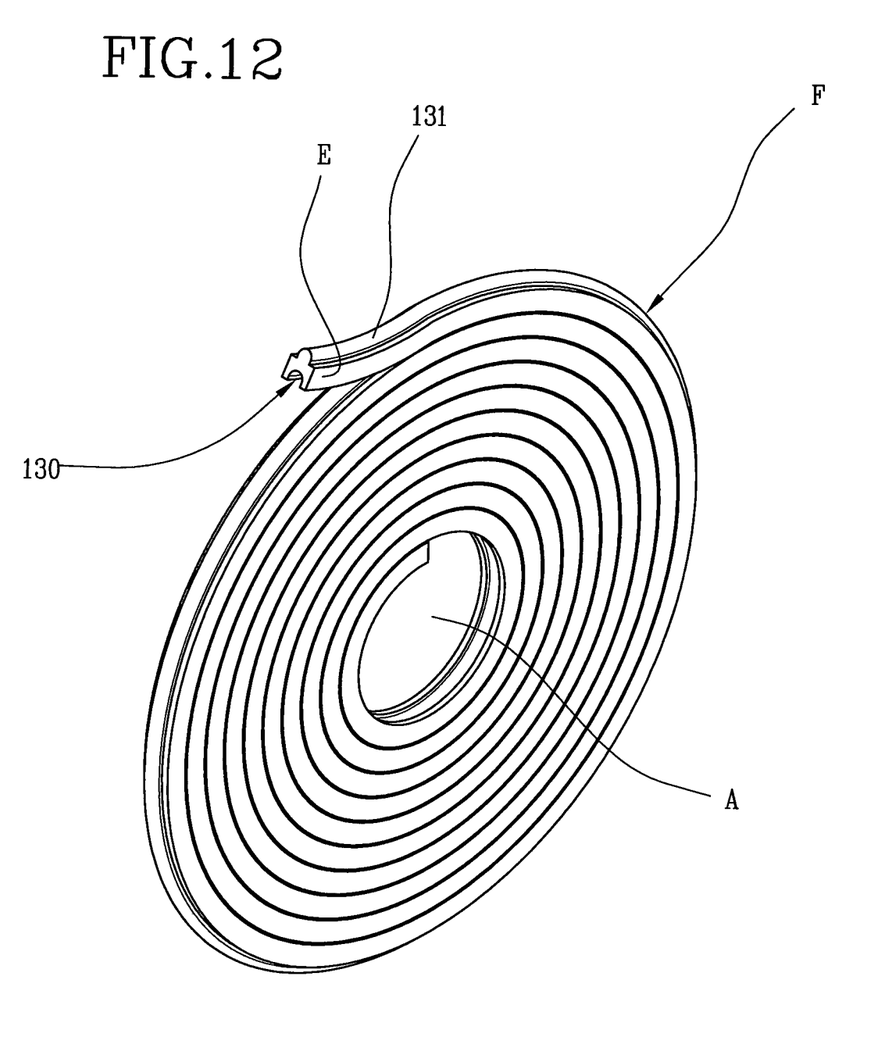
FIG. 12 is a cutting wire wound in a spiral with coplanar coils used in head 1 according to the present invention.

In other words, the aforementioned presser elements 5, 6, 105, 106, mainly due to the conformation and arrangement described above, are adapted to contain and permanently hold between them a cutting wire "F" of the type illustrated in FIG. 12.

The mentioned spiral of cutting wire "F" is wound onto, and resting in, a perpendicular plane to the axis of rotation "X".

Without leaving the scope of protection of the present invention, it is possible to provide, as an alternative position, the mentioned spiral of cutting wire "F" wound onto, and resting in, a plane not perpendicular to the axis of rotation "X".

Preferably, in the event of providing a sharp end "E" of wire exiting the head (variation not illustrated), at least one spiral of wire can be arranged packaged between the presser elements 5, 6, 105, 106.

In the same way, in the event of providing two sharp ends "E" of wire exiting the head (FIG. 1), at least two spirals of wire can be arranged overlapping along the axis of rotation "X" and packaged between the presser elements 5, 6, 105, 106.

As can be seen in FIG. 12, the spiral of cutting wire "F" has a central opening "A" for inserting a part of said casing intended for coupling with a head movement pin.

In more detail, the cutting wire "F" has, on its lateral surface, at least one groove 130 and at least one rib 131 opposite to the groove 130. The groove 130 and the rib 131 extend along the prevalent lengthwise direction of the wire "F", so that the groove 130 of a first winding of the spiral houses the rib 131 of a second winding of the spiral adjacent to the first winding. Therefore partial interpenetration ensues between subsequent windings of the spiral, which gives the spiral the final compact configuration of FIG. 12.

Therefore, in a cross-section wire view, the wire "F" takes on a substantially "Y" shaped section in which the upper part of the "Y" is defined by the groove 130 whereas the leg of the "Y" defines the rib 131.

The present invention reaches the proposed object, overcoming the described disadvantages of the known art.

The particular structure of the head referred to in the present invention makes it suitable for the use of a spiral of cutting wire of the type shown in FIG. 12. Since it is wound in a perpendicular plane to the axis of rotation of the head, such spiral requires for its housing in the head a space with a much smaller axial dimension which therefore allows the use of a head whose dimension along the axis of rotation can also be reduced below the dimension of the lowered heads of the known type.

In particular, what makes the head suitable for the use of the mentioned spiral of cutting wire is the provision of the presser elements and the possibility to move them towards each other so as to compress the spiral between them.

The cooperation of said two characteristics therefore solves the technical problem of being able to assemble on the head a larger amount of wire than the simple chunk of wire strictly necessary for a use cycle, therefore storing it within the heads and, at the same time, reducing the dimensions of the head with respect to the known heads using rigid reels with the wire wound onto them.

Furthermore, the structure of the presser elements that support the spiral along its whole radial extension prevents the spiral, during rotation and in the event of shocks, even violent ones, from losing its planarity and causing the unwinding of the coils with their dispersion within the head.

The invention as described is applicable both to heads with manual reintegration of the wire and heads with automatic reintegration (tap-and-go).

The invention claimed is:

1. A head for hedge trimmer, comprising an external casing intended to rotate around an axis of rotation and equipped with at least one lateral exit hole for a cutting wire, said external casing internally defining a housing for storing a part of the cutting wire so that an end portion of said wire exits from the casing through said at least one lateral hole; said head further comprising, inside said housing, a pair of presser elements facing each other and defining between the presser elements an annular shaped housing to contain said part of the cutting wire, said presser elements being moveable towards each other along said axis of rotation so as to compress between the presser elements said part of the cutting wire stored between the presser elements; wherein the head further comprises clamping means to generate movement between said presser elements so as to clamp between said presser elements said part of the cutting wire stored between the presser elements; said external casing being defined by a first shell-part and a second shell-part, the two shell-parts being joinable through movement towards each other along said axis of rotation and in which said clamping means comprise a compression spring arranged between the first shell-part and a first of said presser elements so as to keep the first presser element pressed towards a second of said presser elements; the second shell-part having a peripheral portion to be permanently associated with the first shell-part and a central portion, slidable with respect to the peripheral portion along said axis of rotation and acting on the second presser element to move the presser elements towards the first shell-part against a thrust action exerted by said spring.

2. The head according to claim 1, wherein each shell-part has a central thrust portion abuttable onto a corresponding one of said presser elements, said clamping means comprising a threaded connection acting between said shell-parts to clamp said shell-parts to each other in a connection configuration in which said shell-parts keep said presser elements close to each other.

3. The head according to claim 2, in which said central thrust portion comprises at least one circular rib arranged around the axis of rotation and in which each central thrust portion also has a plurality of radial ribs extending from the circular rib away from the axis of rotation, and adapted to exert pressure on the corresponding presser element.

4. The head according to claim 2, in which said shell-parts are rigidly coupled between each other with respect to a rotation movement about the axis of rotation.

5. The head according to claim 1, also comprising a pair of auxiliary discs, each abuttable resting against a surface of a respective presser element facing the opposite side with respect to said housing, in which said compression spring is interposed between the first shell-part and a respective first auxiliary disc of said pair of auxiliary discs and in which each auxiliary disc has a plurality of projections facing the corresponding shell-part and engageable within respective seatings obtained in the respective shell-part to make each auxiliary disc and the respective shell-part rigidly coupled between each other.

6. The head according to claim 5, in which said seatings of shell-part have a slot shape for a predetermined angular extension around the axis so as to allow a predetermined angular movement of each auxiliary disc with respect to the respective shell-part around the axis of rotation.

7. The head according to claim 5, in which said auxiliary discs are rigidly coupled between each other with respect to a rotation movement about the axis of rotation.

8. The head according to claim 7, in which the first auxiliary disc has a central sleeve portion arranged along the axis of rotation and slidably inserted, through a grooved coupling, within a corresponding central hole in a second auxiliary disc of said auxiliary discs.

9. The head according to claim 5, in which the projections of a first of said auxiliary discs are disengaged from the seatings of the respective first shell-part when the projections of the second auxiliary disc are engageable within the seatings of the respective second shell-part, said projections being engageable in said respective seatings and disengageable from said respective seatings through translation of said auxiliary discs along the axis of rotation.

* * * * *